(12) United States Patent
Ebner et al.

(10) Patent No.: US 11,244,470 B2
(45) Date of Patent: Feb. 8, 2022

(54) METHODS AND SYSTEMS FOR SENSING OBSTACLES IN AN INDOOR ENVIRONMENT

(71) Applicant: Xerox Corporation, Norwalk, CT (US)

(72) Inventors: Fritz Francis Ebner, Pittsford, NY (US); Abhisek Dey, Rochester, NY (US); Karthik Subramanian, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 117 days.

(21) Appl. No.: 16/809,901

(22) Filed: Mar. 5, 2020

(65) Prior Publication Data
US 2021/0279907 A1    Sep. 9, 2021

(51) Int. Cl.
*G06T 7/70*    (2017.01)
*H04W 4/33*    (2018.01)
(Continued)

(52) U.S. Cl.
CPC ............... *G06T 7/70* (2017.01); *G06N 3/04* (2013.01); *G06N 3/08* (2013.01); *H04W 4/026* (2013.01);
(Continued)

(58) Field of Classification Search
CPC combination set(s) only.
See application file for complete search history.

(56) References Cited

U.S. PATENT DOCUMENTS

| 7,958,562 | B2 | 6/2011 | Gaucas |
| 8,548,738 | B1 | 10/2013 | Kadous et al. |

(Continued)

FOREIGN PATENT DOCUMENTS

| CN | 103925923 B | 6/2017 |
| JP | 2009187103 A | 8/2009 |

OTHER PUBLICATIONS

Shuihua Wang, "Detecting Stairs and Pedestrian Crosswalks for the Blind by RGBD Camera", Feb. 25, 2013, 2012 IEEE International Conference on Bioinformatics and Biomedicine Workshops (BIBMW), pp. 732-736.*

(Continued)

*Primary Examiner* — Omar S Ismail
(74) *Attorney, Agent, or Firm* — Fox Rothschild LLP

(57) ABSTRACT

A system of determining a distance between a mobile electronic device and an obstacle in an environment includes an electronic device, and a computer-readable storage medium. The computer-readable storage medium includes one or more programming instructions that, when executed, cause the electronic device to obtain from a camera of a mobile electronic device one or more images of one or more obstacles in a surrounding environment, and apply a convolution neural network to one or more of the obtained images to generate a one-dimensional array of depth perception estimates. The array includes one or more angle-distance pairs. an angle value of each angle-distance pair represents an angle of one or more of the obstacles relative to the camera. A distance value of each angle-distance pairs represents an estimated distance between the camera and one or more of the obstacles at the corresponding angle of the angle-distance pair.

24 Claims, 13 Drawing Sheets

(51) Int. Cl.
*H04W 4/029* (2018.01)
*G06N 3/08* (2006.01)
*H04W 4/02* (2018.01)
*G06N 3/04* (2006.01)

(52) U.S. Cl.
CPC .......... *H04W 4/029* (2018.02); *H04W 4/33* (2018.02); *G06T 2207/10024* (2013.01); *G06T 2207/20081* (2013.01); *G06T 2207/20084* (2013.01)

(56) References Cited

U.S. PATENT DOCUMENTS

| | | | |
|---|---|---|---|
| 8,583,400 | B2 | 11/2013 | Thrun et al. |
| 8,934,112 | B1 | 1/2015 | Gross et al. |
| 8,982,384 | B2 | 3/2015 | Evanitsky |
| 8,986,867 | B2 | 3/2015 | Baek |
| 9,201,619 | B2 | 12/2015 | Gross et al. |
| 9,367,271 | B2 | 6/2016 | Zehler et al. |
| 9,549,089 | B1 | 1/2017 | Tredoux et al. |
| 9,740,447 | B1 | 8/2017 | Krishnasamy et al. |
| 9,894,604 | B1 | 2/2018 | Tran et al. |
| 10,104,247 | B2 | 10/2018 | Packirisamy et al. |
| 10,116,826 | B1 | 10/2018 | Ravikiran et al. |
| 10,440,221 | B2 | 10/2019 | Ebner |
| 10,694,053 | B1 | 6/2020 | Ebner et al. |
| 2004/0075861 | A1 | 4/2004 | Shima et al. |
| 2004/0264427 | A1 | 12/2004 | Jaakkola et al. |
| 2006/0221901 | A1 | 10/2006 | Yaqub et al. |
| 2007/0019670 | A1 | 1/2007 | Falardeau |
| 2008/0080458 | A1 | 4/2008 | Cole |
| 2009/0028082 | A1 | 1/2009 | Wynn et al. |
| 2010/0040029 | A1 | 2/2010 | Doppler et al. |
| 2011/0063663 | A1 | 3/2011 | Kim et al. |
| 2011/0306364 | A1 | 12/2011 | Gossain et al. |
| 2012/0075664 | A1 | 3/2012 | Nichols et al. |
| 2012/0179737 | A1 | 7/2012 | Baranov et al. |
| 2013/0286942 | A1 | 10/2013 | Bonar et al. |
| 2013/0346138 | A1 | 12/2013 | Rai |
| 2014/0022587 | A1 | 1/2014 | Coccia et al. |
| 2014/0256286 | A1 | 9/2014 | Rangarajan |
| 2015/0189023 | A1 | 7/2015 | Kubota et al. |
| 2015/0358790 | A1 | 12/2015 | Nasserbakht |
| 2015/0363141 | A1 | 12/2015 | Fernandes et al. |
| 2017/0008174 | A1* | 1/2017 | Rosen ............... B25J 9/1694 |
| 2017/0123737 | A1 | 5/2017 | Januszewski et al. |
| 2017/0142549 | A1 | 5/2017 | Herbert et al. |
| 2017/0171718 | A1 | 6/2017 | Jeong et al. |
| 2017/0289813 | A1 | 10/2017 | Pashkov et al. |
| 2017/0304732 | A1* | 10/2017 | Velic ............... G06N 3/08 |
| 2017/0347388 | A1 | 11/2017 | Cai et al. |
| 2018/0083795 | A1 | 3/2018 | Zehler et al. |
| 2018/0172451 | A1 | 6/2018 | Wang et al. |
| 2018/0237137 | A1 | 8/2018 | Tovey et al. |
| 2018/0249298 | A1 | 8/2018 | Jain et al. |
| 2018/0316821 | A1 | 11/2018 | Ebner |
| 2018/0367698 | A1 | 12/2018 | Krishnasamy et al. |
| 2019/0014233 | A1 | 1/2019 | Krishnasamy et al. |
| 2019/0026051 | A1 | 1/2019 | Krishnasamy et al. |
| 2019/0026052 | A1 | 1/2019 | Krishnasamy et al. |
| 2019/0114804 | A1* | 4/2019 | Sundaresan ............ G06K 9/66 |
| 2019/0304102 | A1* | 10/2019 | Chen ............... G06K 9/6271 |
| 2019/0373407 | A1 | 12/2019 | Bhatti et al. |
| 2020/0193609 | A1* | 6/2020 | Dharur ............... G06T 7/11 |

OTHER PUBLICATIONS

Khaled Saleh, "End-to-End Indoor Navigation Assistance for the Visually Impaired using Monocular Camera", Jan. 17, 2019, 2018 IEEE International Conference on Systems, Man, and Cybernetics (SMC), pp. 3504-3508.*

Imran Ashraf, "Application of Deep Convolutional Neural Networks and Smartphone Sensors for Indoor Localization", Jun. 6, 2019, Applied Sciences 2019, 9, 2337; doi:10.3390/app9112337, www.mdpi.com/journal/applsci, pp. 1-10.*

Shahira K C,"Obstacle Detection, Depth Estimation And Warning System For Visually Impaired People", Dec. 12, 2019,2019 IEEE Region 10 Conference (TENCON 2019),pp. 863-865.*

HyeongYeop Kang,"Obstacle Detection and Alert System for Smartphone AR Users",VRST '19, Nov. 12-15, 2019, Parramatta, NSW, Australia © 2019 Association for Computing Machinery,https://doi.org/10.1145/3359996.3364256.*

Saxena, A. et al., "Learning Depth from Single Monocular Images".

Godard, C. et al., "Digging Into Self-Supervised Monocular Depth Estimation".

Bhoi, A., "Monocular depth Estimation: A Survey", [cs.CV] Jan. 27, 2019.

Nu, Y. et al., "HTrack: An Efficient Heading-Aided Map Matching for Indoor Localization and Tracking", IEEE Sensors Journal, vol. 19, No. 8, Apr. 15, 2019.

Seco, F. et al., "Smartphone-Based Cooperative Indoor Localization with RFID Technology", Sensors 2018, 18, 266.

Murata M. et al., "Smartphone-based Indoor Localization for Blind Navigation across Building Complexes", 2018 IEEE International Conference on Pervasive Computing and Communications (PerCom).

Information about Related Patent and Patent Applications, see section 6 of the accompanying Information Disclosure Statement Letter, which concerns Related Patents and Patent Applications.

U.S. Appl. No. 17/088,786, filed Nov. 4, 2020, System and Method for Indoor Navigation.

U.S. Appl. No. 17/326,477, filed May 21, 2012, Indoor Positioning System for a Mobile Electronic Device.

U.S. Appl. No. 17/004,145, filed Aug. 27, 2020, Method for Estimating Indoor Location of a Device.

U.S. Appl. No. 16/878,753, filed May 20, 2020, Wireless Location Tracking Tag for Monitoring Real Time Location-Tracking Apparatus for an Electronic Device.

U.S. Appl. No. 17/189,361, filed Mar. 2, 2021, System and Method to Manage Building Occupancy Based on Disease Risk, Location Capacity and Occupant Loading.

Yang, J. et al., "Indoor Localization Using Improved RSS-Based Lateration Methods", IEEE "GLOBECOM" 2009 Proceedings.

Cotera P. et al., "Indoor Robot Positioning using an Enhanced Trilateration Algorithm", International Journal of Advanced Robotic Systems, 2016, 13:110 | doi: 10.5772/63246.

Maduskar, D. et al., "RSSI based adaptive indoor location tracker", Maduskar and Tapaswi Scientific Phone Apps and Mobile Devices (2017) 3.3, DOI 10.1186/s41070-017-0015-z.

* cited by examiner

METHODS AND SYSTEMS FOR SENSING OBSTACLES IN AN INDOOR ENVIRONMENT

BACKGROUND

Many electronic systems use images to determine features of their environment. For example, robotic systems use images to identify obstacles that are present in the environment. Security systems may use cameras to detect intruders and other potential threatening objects. Mobile electronic devices may use cameras to help the user navigate an environment by identifying features of the environment.

In each of these situations, the device or system must not only identify the object, but also determine a distance between the camera and the object. Distance information can help the system make decisions about navigation (such as avoid a collision with the object), estimate the time that an approaching object may reach the system, and/or help determine a location of the system within an environment based on a known location of the detected object.

To determine distance to a detected object the system must estimate depth in the image. When the image is a monocular image, estimation of depth is a difficult computational task. To address this, prior systems have used stereo cameras and/or a combination of cameras with other sensors that provide three-dimensional data such as radar or LIDAR systems. However, such systems are costly. They are also large, and they are therefore impractical to add to systems such as mobile phones, electronic tablets and other portable electronic devices.

This document describes a novel method of estimating depth in a monocular image that addresses at least some of the issues described above.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system of determining a distance between a mobile electronic device and an obstacle in an environment includes an electronic device, and a computer-readable storage medium. The computer-readable storage medium includes one or more programming instructions that, when executed, cause the electronic device to obtain from a camera of a mobile electronic device one or more images of one or more obstacles in a surrounding environment, and apply a convolution neural network to one or more of the obtained images to generate a one-dimensional array of depth perception estimates. The array includes one or more angle-distance pairs. an angle value of each angle-distance pair represents an angle of one or more of the obstacles relative to the camera. A distance value of each angle-distance pairs represents an estimated distance between the camera and one or more of the obstacles at the corresponding angle of the angle-distance pair.

The convolution neural network may be trained on a loss function represented by:

$$L_{Primary} = \frac{1}{n}\sum_{i=1}^{n} e^{|y_i - y_{i(true)}|}$$

where n is the array;
$Y_i$ is an output of the convolution neural network for measurement i,
$Y_{true}$ is an actual distance for measurement i.

The array may have a length of 224. Each angle value may represent an index of the array.

The camera may include a monocular RGB (Red, Green, Blue) camera. The camera may include a rear-facing camera.

The convolution neural network may include one or more trainable convolution layers, one or more global average pooling layers, and a fully-connected layer. The one or more of the trainable convolution layers may be arranged in a sequence. One or more of the trainable convolution layers may be configured to accept as input an output of a previous trainable convolution layer in the sequence and filter it with its own kernel.

The system may fine tune the convolution neural network using the following function:

$$L_{Secondary} = \frac{1}{n}\sum_{i=1}^{n} |y_i - y_{i(true)}|$$

where n is a matrix of depth perception estimates having a length of 224;
$Y_i$ is an output of the convolution neural network for measurement i
$Y_{true}$ is an actual distance for measurement i The system may apply a second convolution neural network to one or more of the obtained images to generate a confidence metric associated with one or more of the depth perception estimates. The confidence metric may represent an indication of how accurate the associated depth perception estimate is. The second convolution neural network may include one or more trainable convolution layers, one or more global maximum pooling layers, and a confidence layer.

The system may not update the convolution neural network to incorporate any of the depth perception estimates that are associated with a confidence metric that is below a threshold value or outside of a threshold range of values.

DETAILED DESCRIPTION

The following terms shall have, for purposes of this application, the respective meanings set forth below:

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The term "obstacle" refers to an object or objects that at least partially block, prevent or hinder an individual from traversing a path in an indoor environment. Examples of obstacles include, without limitation, walls, doors, stairways, elevators, windows, cubicles, and/or the like.

The term "particle" refers to a representation of a particular location and/or a heading in an indoor environment.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

Figure 1:
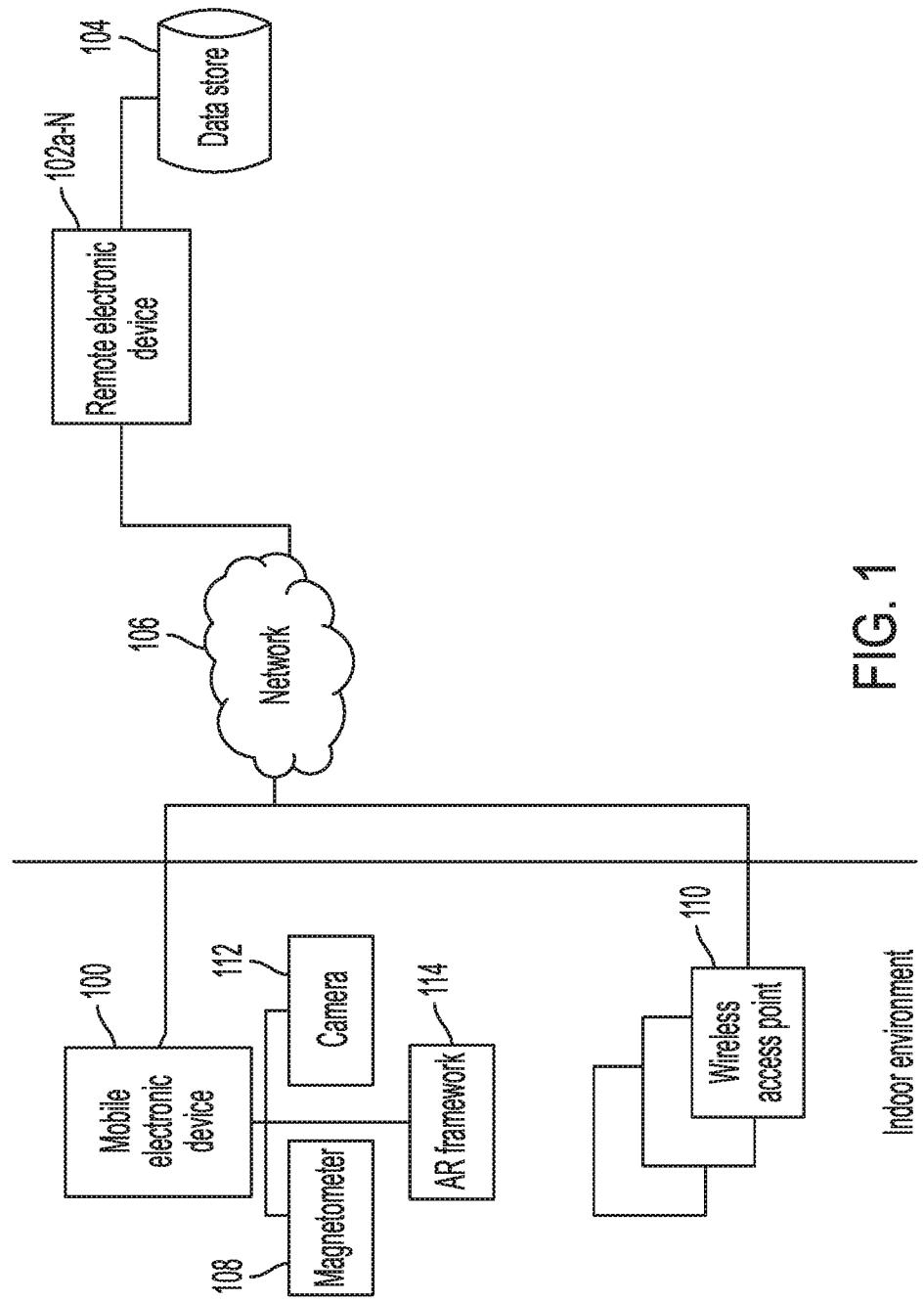
FIG. 1 illustrates an example indoor location tracking system.

FIG. 1 illustrates an example indoor location tracking system according to an embodiment. As illustrated in FIG. 1, an indoor location tracking system may include a mobile electronic device 100 and one or more remote electronic devices 102a-N. A mobile electronic device 100 may be a portable electronic device such as, for example, a smartphone, a tablet, a laptop, a wearable and/or the like.

In an embodiment, a remote electronic device 102a-N may be located remotely from a mobile electronic device 100. A server is an example of a remote electronic device 102a-N according to an embodiment. A remote electronic device 102a-N may have or be in communication with one or more data stores 104.

A mobile electronic device 100 may be in communication with one or more remote electronic devices via one or more communication networks 106. A communication network 106 may be a local area network (LAN), a wide area network (WAN), a mobile or cellular communication network, an extranet, an intranet, the Internet and/or the like.

A mobile electronic device 100 may include one or more sensors that provide compass functionality. For instance, a mobile electronic device 100 may include a magnetometer 108. A magnetometer 108 may measure the strength and direction of magnetic fields, which may permit a mobile electronic device 100 to determine its orientation.

A mobile electronic device may include one or more cameras 112. As discussed below, a camera may be an RGB (Red, Green, Blue) camera, an RGB-D camera, and/or the like.

In various embodiments, a mobile electronic device 100 may support an augmented reality (AR) framework 114. An AR framework 114 refers to one or more programming instructions that when executed, cause a mobile electronic device to perform one or more actions related to integrating digital content into a real-world environment. In this document, the term "augmented reality" or "AR" when used with reference to an electronic device or method of using an electronic device, refers to the presentation of content so that the user of the device is able to see at least part of the real-world environment with virtual content overlaid on top of the real-world environment. A mobile electronic device 100 that supports an AR framework 114 may cause virtual content to be overlaid on top of a real-world environment as depicted through a camera application. For example, a camera 112 of a mobile electronic device 100 may capture one or more images of a real-world environment, and an AR framework 114 may cause virtual content to be overlaid on top of these images.

As illustrated in FIG. 1, an indoor location tracking system may include one or more wireless access points 110. A wireless access point 110 refers to a hardware electronic device that permits a wireless enabled electronic device to connect to a wired network. A wireless access point 110 may be a standalone device which is positioned at various locations in an indoor environment. Alternatively, a wireless access point 110 may be a component of another device, such as, for example, a router which is similarly positioned throughout an environment. The wireless access points 110 may be present in a high enough density to service an entire environment.

In various embodiments, a wireless access point 110 may log the time and the strength of one or more communications from a mobile electronic device 100. The wireless access point 110 may send at least part of the logged information to an electronic device such as, for example, a remote electronic device 102a-N. The remote electronic device 102a-N may use the received information to estimate a location of a mobile electronic device 100. For example, a remote electronic device 102a-N may use the received information to determine a position of a mobile electronic device 100 relative to a fixed point in the environment. A remote electronic device may store or have access to a map of a relevant environment, and may use the map to determine a position of a mobile electronic device relative to a reference point. This position may be measured as a certain distance from a reference point, or as one or more position coordinates, such as longitude and latitude.

In various embodiments, an indoor location tracking system, such as the one described with respect to FIG. 1, may use low accuracy and high latency WiFi location tracking techniques to establish an initial position of a mobile electronic device in an indoor environment. As explained in more detail below, this initial positon may not be a precise or accurate representation of the true location of a mobile electronic device in the indoor environment.

An indoor location tracking system may use information from an AR framework of a mobile electronic device being tracked to establish a relative distance and heading. A depth estimation technology may provide information about distances from the mobile electronic device to one or more obstacles. An indoor location tracking system may utilize a particle filter to fuse together data to provide an indoor location and heading estimate for the mobile electronic device.

Figure 2:
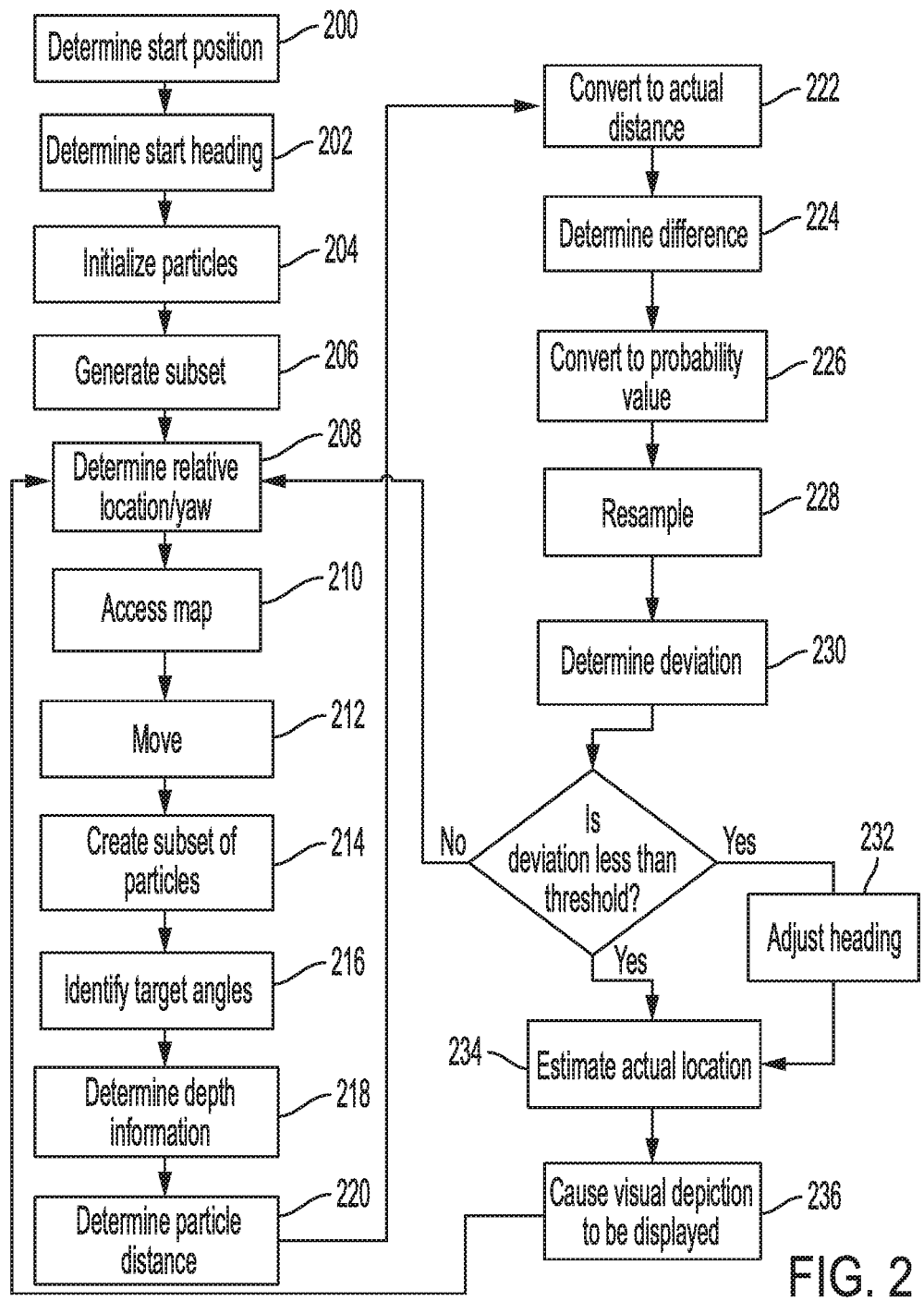
FIG. 2 illustrates an example indoor location tracking method.
Figure 3:
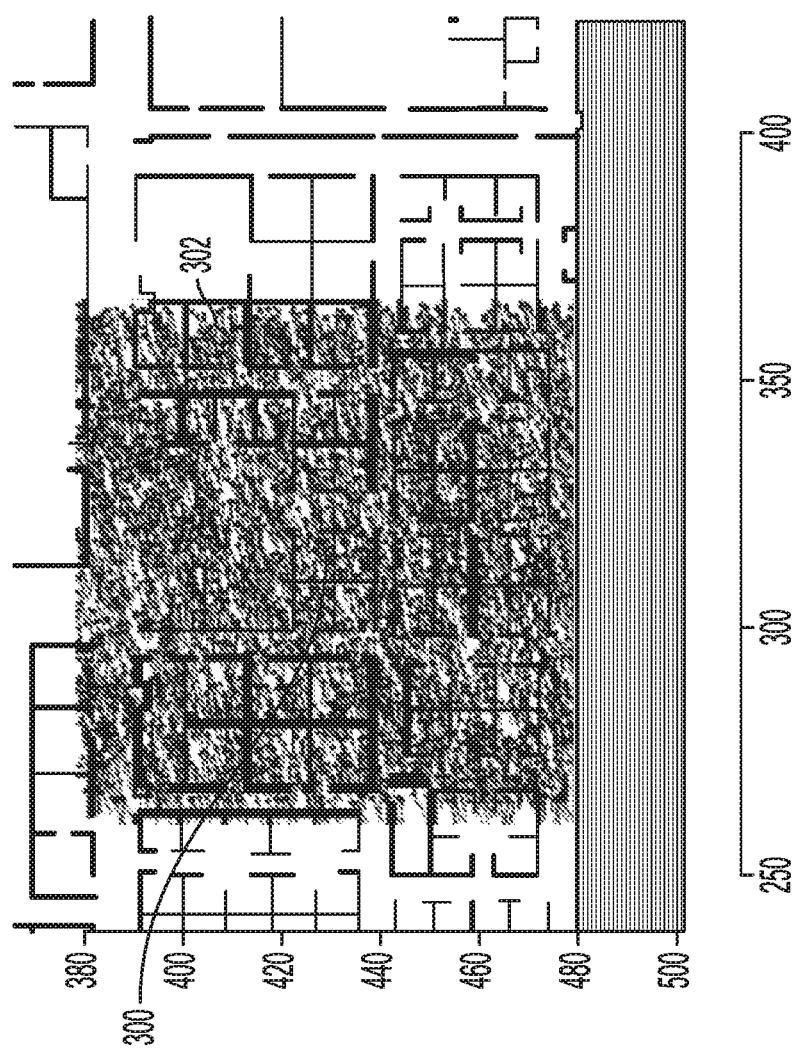
FIG. 3 illustrates an example map.

FIG. 2 illustrates an example indoor location tracking method according to an embodiment. As illustrated by FIG. 2, an indoor location tracking system may determine 200 a start position of a mobile electronic device in an indoor environment. An indoor location tracking system may determine 200 a start position of a mobile electronic device by performing WiFi localization according to an embodiment. For instance, a wireless access point located in the indoor environment may log the time and the strength of one or more communications from the mobile electronic device. This information may be used to determine 200 a start position associated with the mobile electronic device. For instance, the wireless access point may send at least part of the logged information to an electronic device such as, for example, a remote electronic device. The remote electronic device may use the received information to estimate a location of a mobile electronic device. In various embodiments, the determined start position associated with a mobile electronic device may be within fifty feet from the true location of the mobile electronic device. FIG. 3 illustrates an example map showing a mobile device's estimated location 300 versus the true location 302 of the mobile electronic device according to an embodiment.

In various embodiments, an indoor location tracking system may determine 202 a start heading associated with the mobile electronic device. For example, one or more sensors of the mobile electronic device (e.g., a magnetometer) may obtain a start heading associated with the mobile electronic device. The obtained start heading may be within twenty degrees of the true heading of the mobile electronic device in various embodiments.

Figure 4:
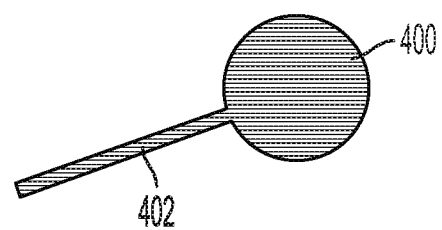
FIG. 4 illustrates an example particle.

An indoor location tracking system may initialize 204 one or more particles around the start location and start heading for the mobile electronic device. A particle refers to a representation of a particular location and/or a heading in the indoor environment. FIG. 4 illustrates an example particle having a location 400 and heading 402. In an embodiment, an indoor location tracking system may initialize one or more particles by assigning one or more states (e.g., a location and/or a heading) to one or more particles.

An indoor location tracking system may initialize 204 particles within a threshold distance from the start location. For instance, the system may initialize 204 particles +/−50 feet from the start location (e.g., (start x, start y) position). Other threshold distances may be used within the scope of this disclosure. An indoor location tracking system may initialize 204 particles within a threshold angle relative to the start heading. For example, the system may initialize 204 one or more particles within +/−20 degrees from the start heading.

In various embodiments, the system may generate 206 a subset of the initialized particles. The subset may be generated 206 based on a position of the initialized particles. For instance, the system may determine whether any of the initialized particles have a position that corresponds to a position of one or more obstacles as defined by a map of an indoor environment, as discussed in more detail below. The system may generate 206 a subset of particles that excludes these particles.

An indoor location tracking system may determine 208 a relative location and a relative yaw value associated with the mobile electronic device. In various embodiments, an indoor location tracking system may obtain 208 a relative location and/or a relative yaw value from an AR framework associated with the mobile electronic device. A relative location refers to a current location of a mobile electronic device relative to its start location. A relative location of a mobile electronic device may be represented as coordinates such as, for example, (x, y). A relative yaw value refers to a yaw value relative to a start yaw value.

For example, an AR framework may access a camera of a mobile electronic device to obtain one or more images of an indoor environment. The AR framework may perform one or more image processing techniques on the image(s) to determine a relative location and/or a relative yaw value associated with the electronic device. Alternatively, an AR framework may determine a relative location and/or relative yaw associated with an electronic device based on motion information captured by one or more sensors of the mobile electronic device such as, for example, a gyroscope, an accelerometer and/or the like.

Figure 5:
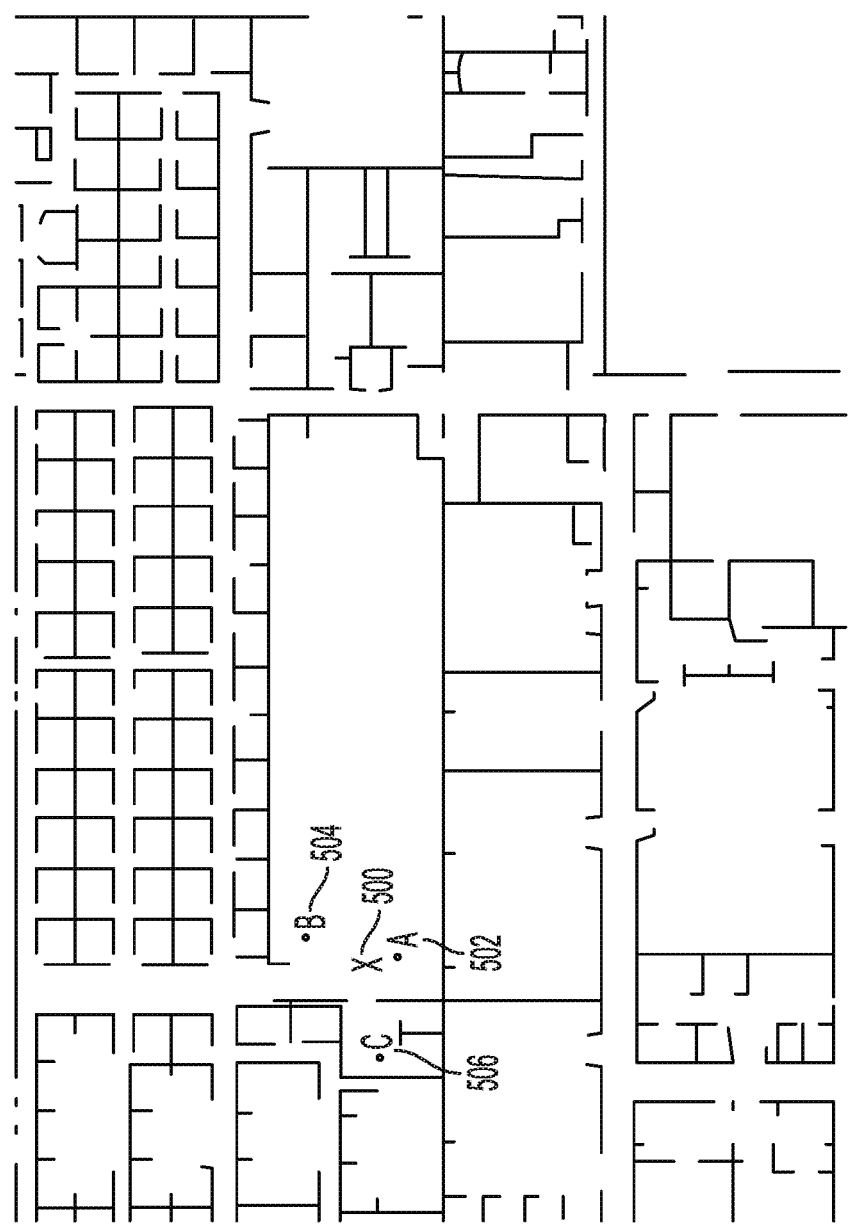
FIG. 5 illustrates an example map showing a relative location for a mobile electronic device and locations of example particles.

Referring back to FIG. 2, an indoor location tracking system may access 210 a map of the indoor environment. A map may be an electronic representation of the indoor environment. In various embodiments, a map may include visual representations of one or more obstacles in the indoor environment. The obstacles may be permanent or semi-permanent obstacles such as, for example, walls, stairs, elevators, and/or the like. A map may be stored in a data store associated with or accessible to the indoor location tracking system. FIG. 5 illustrates an example map showing a relative location 500 for a mobile electronic device and locations of example particles A 502, B 504, and C 506.

Referring back to FIG. 2, a position of the mobile electronic device may change 212. For example, a user of the mobile electronic device may move or otherwise change position. In various embodiments, the indoor location tracking system may create 214 a subset of particles. The system may determine whether the move has caused one or more of the particles to hit an obstacle as indicated by the map. For example, a mobile electronic device user may move two feet. The system may determine whether adjusting the position of any of the particles by two feet along each particle's heading would cause the particle to hit an obstacle as defined by the map. If the system determines that the move has caused a particle to hit an obstacle, the system may not include the particle in the subset. As such, the subset of particles that is created 214 by the system only includes those particles that the move has not caused to hit an obstacle.

An indoor location tracking system may identify 216 one or more target angles, each referred to in this document as a theta. Each target angle may be within a certain range of the relative yaw value. For example, a theta may be within 20 degrees from the relative yaw value. Additional and/or alternate ranges may be used within the scope of this disclosure.

For each of the identified target angles, the indoor tracking system may determine 218 a distance between a relative location of the mobile device and an obstacle nearest to the relative location at the target angle (referred to in this disclosure as a mobile device distance). In various embodiments, an indoor tracking system may identify a path that extends away from the relative location of the mobile electronic device at the target angle. The system may determine a distance between the relative location and the first (or nearest) obstacle that is encountered along the path.

Figure 6:
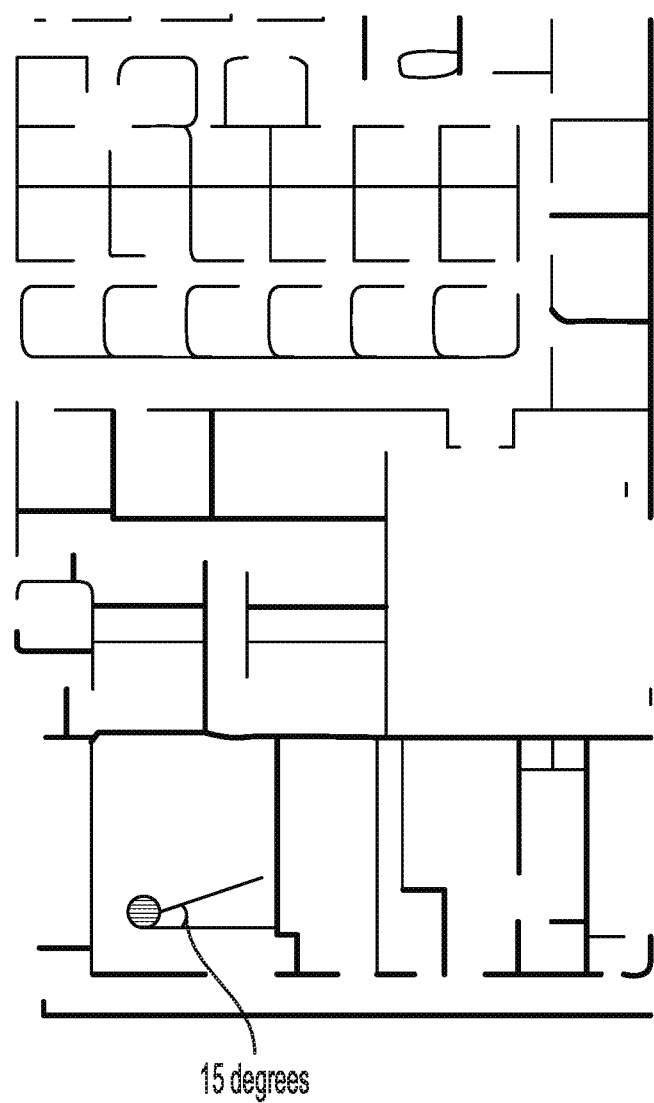
FIG. 6 illustrates a visual representation of a relative location of a mobile electronic device.

As an example, if a relative location of a mobile electronic device is represented by (A, B) and the target angle is 15 degrees, the indoor tracking system may determine a distance between (A, B) and obstacle at 15 degrees. FIG. 6 illustrates a visual representation of this example according to an embodiment. Table 1 illustrates example theta and distance pairs according to an embodiment.

TABLE 1

| Theta (degrees) | Mobile device distance (feet) |
|---|---|
| 10 | 22 |
| 15 | 16 |
| 20 | 11 |

In various embodiments, the system may determine 218 mobile device distance relative to an obstacle. A camera associated with a mobile electronic device may capture one or more images of its surrounding environment. In various embodiments, the camera may be a monocular RGB (Red, Green, Blue) camera. The camera may be a RGB-D camera, which may include one or more depth-sensing sensors. The depth sensor(s) may work in conjunction with a RGB camera to generate depth information related to the distance to the sensors on a pixel-by-pixel basis. A camera may be integrated into the mobile electronic device such as, for example, a rear-facing and/or a front-facing camera. In other embodiments, a camera may be one that is attached to or otherwise in communication with a mobile electronic device.

The system may obtain one or more of the captured images from the camera, and may apply a machine learning model such as, for example, a convolutional neural network (CNN), to one or more of the obtained images 700 to determine a depth estimate between the mobile electronic device and an obstacle. A CNN may be pre-trained using a set of color images. A CNN may be used to extract image features separate from depth and color modalities, and subsequently combine these features using a fuser technique.

Figure 7:
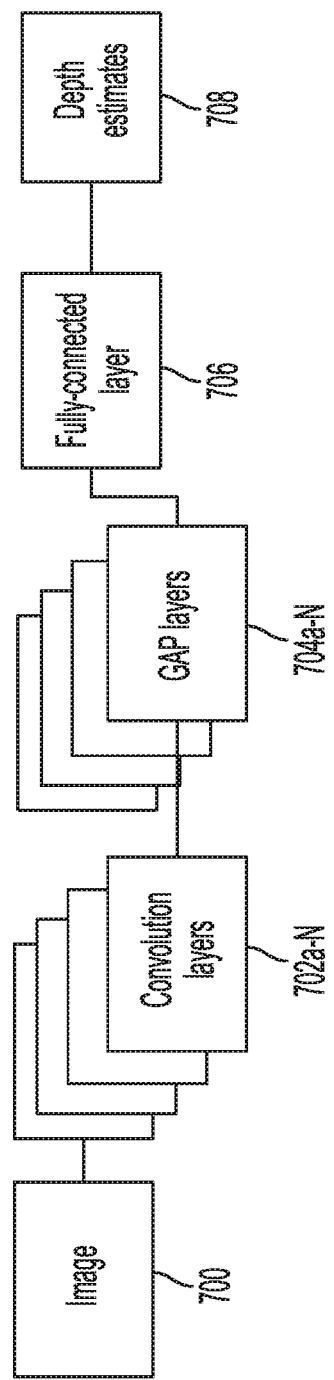
FIG. 7 illustrates an example representation of a convolutional neural network.

As illustrated by FIG. 7, a CNN may include multiple trainable convolution stages or layers 702a-N connected to one another. Each convolution layer 702a-N may learn hierarchies of features obtained from input data. One or more of the convolution layers 702a-N may extract image features such as, for example, edges, lines, corners and/or the like, from one or more input images 700. An input image may be a color image (e.g., an RGB image) from a dataset of high-resolution color images. A dataset may include at least a portion of images from an image database such as, for example, ImageNet, ResNet50, or another commercially-available or private database having a large number of images. Each image may be converted to a fixed resolution such as, for example, 224×224×3 pixels for RGB images.

For each convolutional layer 702a-N, a set of parameters may be initialized in the form of an array or matrix (referred to in this disclosure as a kernel). The kernel may be applied across a width and height of an input image to convolve the parameters with brightness intensities for the pixels in the input image subject to a threshold for each pixel to generate a feature map having a dimensionality. Each convolution may represent a neuron that looks at only a small region of an input image based on the applied kernel. The number of neurons outputted from a convolution layer may depend on the depth of the applied kernel. A subsequent convolutional layer may take as input the output of a previous convolutional layer and filters it with its own kernel.

In various embodiments, convolutional layers 702a-N may be combined with one or more global average pooling (GAP) layers 704a-N. A GAP layer may calculate the average output of each feature map in the previous layer. As such, a GAP layer 704a-N may serve to significantly reduce the data being analyzed and reduce the spatial dimensions of a feature map.

The output of the GAP layers 704a-N may be provided to a fully-connected layer 706. This output may be represented as a real-valued array having the activations of only a predetermined number of neurons. For instance, the output may be represented as an array of depth estimates 708 for one or more obstacles of an input image.

As an example, applying a CNN to images denoting one or more obstacles may generate a one-dimensional array of depth perception estimates. The array may include one or more angle-distance pairs. An angle value of an angle-distance pair may represent an angle of an obstacle relative to a camera, for example a camera of a mobile electronic device that captured one or more of the images. A distance value of an angle-distance pair may represent an estimated distance between the camera and an obstacle at the corresponding angle. The array may have a length of 224. However, it is understood that alternate lengths may be used within the scope of this disclosure.

In various embodiments, a CNN may be trained on a loss function. An example of such a loss function may be represented by the following:

$$L_{Primary} = \frac{1}{n}\sum_{i=1}^{n} e^{|y_i - y_{i(true)}|}$$

where n is a matrix of depth perception estimates having a length of 224;
$Y_i$ is an output of the CNN (e.g., a value from n)
$Y_{true}$ is an actual distance (e.g., one measured by LiDAR or other suitable mechanisms)

This loss function penalizes the bigger errors more than the smaller ones, and helps to stabilize the root mean square error while training. It is understood that other loss functions may be used within the scope of this disclosure.

In various embodiments, a CNN may be fine-tuned based on the following function:

$$L_{Secondary} = \frac{1}{n}\sum_{i=1}^{n} |y_i - y_{i(true)}|$$

where n is a matrix of depth perception estimates having a length of 224;

$Y_i$ is an output of the CNN (e.g., a value from n) for measurement i $Y_{true}$ is an actual distance (e.g., one measured by LiDAR or other suitable mechanisms) for measurement i It is understood that other functions may be used to fine tune a CNN.

Figure 8A:
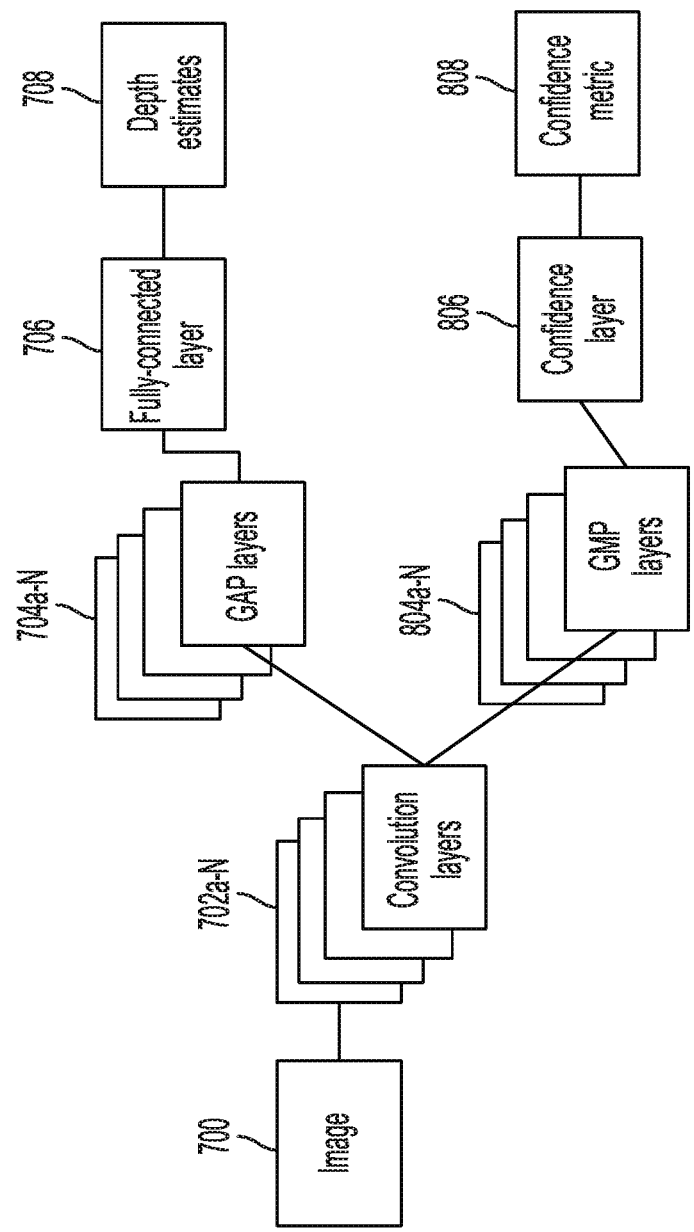
FIGS. 8A and 8B illustrate example convolutional neural networks according to various embodiments.

In various embodiments, the system may utilize one or more CNNs to determine a confidence metric associated with one or more of the depth perception estimates described above. In an embodiment, the CNN may be the same CNN as discussed above with respect to FIG. 7, as illustrated in FIG. 8A. Alternatively, the CNN may be a separate CNN than described above, as illustrated in FIG. 8B.

A confidence metric refers to an indication of the accuracy of a depth perception estimate. For instance, a confidence metric may be a value or a range of values that are indicative of a confidence that an associated depth perception estimate is accurate.

Figure 8B:
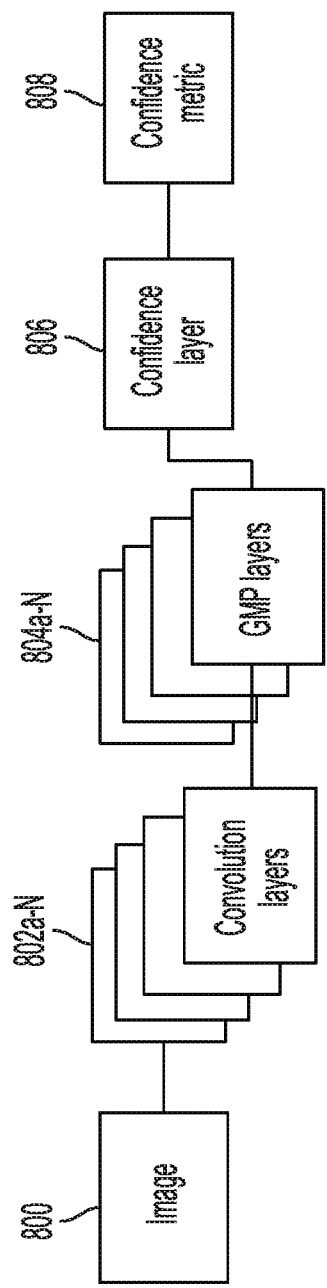

FIG. 8B illustrates an example CNN according to an embodiment. As illustrated in FIG. 8, a CNN may include multiple trainable convolution stages or layers 800a-N connected to one another. Each convolution layer 802a-N may learn hierarchies of features obtained from input data. One or more of the convolution layers 802a-N may extract image features such as, for example, edges, lines, corners and/or the like, from one or more input images 700. An input image may be a color image (e.g., an RGB image) from a dataset of high-resolution color images. A dataset may include at least a portion of images from an image database such as, for example, ImageNet, ResNet50, or another commercially-available or private database having a large number of images. Each image may be converted to a fixed resolution such as, for example, 224×224×3 pixels for RGB images.

For each convolutional layer 802a-N, a set of parameters may be initialized in the form of an array or matrix (referred to in this disclosure as a kernel). The kernel may be applied across a width and height of an input image to convolve the parameters with brightness intensities for the pixels in the input image subject to a threshold for each pixel to generate a feature map having a dimensionality. Each convolution may represent a neuron that looks at only a small region of an input image based on the applied kernel. The number of neurons outputted from a convolution layer may depend on the depth of the applied kernel. A subsequent convolutional layer may take as input the output of a previous convolutional layer and filters it with its own kernel.

In various embodiments, convolutional layers 802a-N may be combined with one or more global max pooling (GMP) layers 804a-N. A GMP layer may calculate the maximum or largest output of each feature map in the previous layer.

The output of the GMP layers 804a-N may be provided to a confidence layer 806. This output may be represented as a confidence metric. For instance, an example of a confidence metric may be a value between '0' and '1', where values closer to '0' indicate a low confidence and values closer to '1' indicate a high confidence. In various embodiments, applying a CNN may generate a one-dimensional array of confidence values that may correspond to one or more depth perception estimates. As such, a confidence value may indicate an estimated measure of how accurate a depth perception estimate is.

In various embodiments, the system may not update a machine learning model to incorporate a depth perception estimate into if the confidence metric associated with the depth perception estimate is lower than a threshold value, is outside of a range of threshold values, and/or the like. For instance, if confidence metrics have values between '0' and '1', the system may not update a machine learning model to incorporate a depth perception estimate if the confidence metric associated with the depth perception estimate is lower than 0.80. Additional and/or alternate confidence value ranges and/or threshold values may be used within the scope of this disclosure.

For one or more of the particles in the subset, the indoor tracking system may determine 220 a distance between the particle's location and a nearest obstacle at one or more of the identified target angles (referred to in this disclosure as a particle distance).

The indoor tracking system may determine 220 a distance between a particle's location and an obstacle depicted on the map at one or more of the identified target angles. The system may identify a path that extends away from the particle's location at a target angle. The system may determine a distance between the particle's location and the first (or nearest) obstacle that is encountered along the path.

Figure 9:
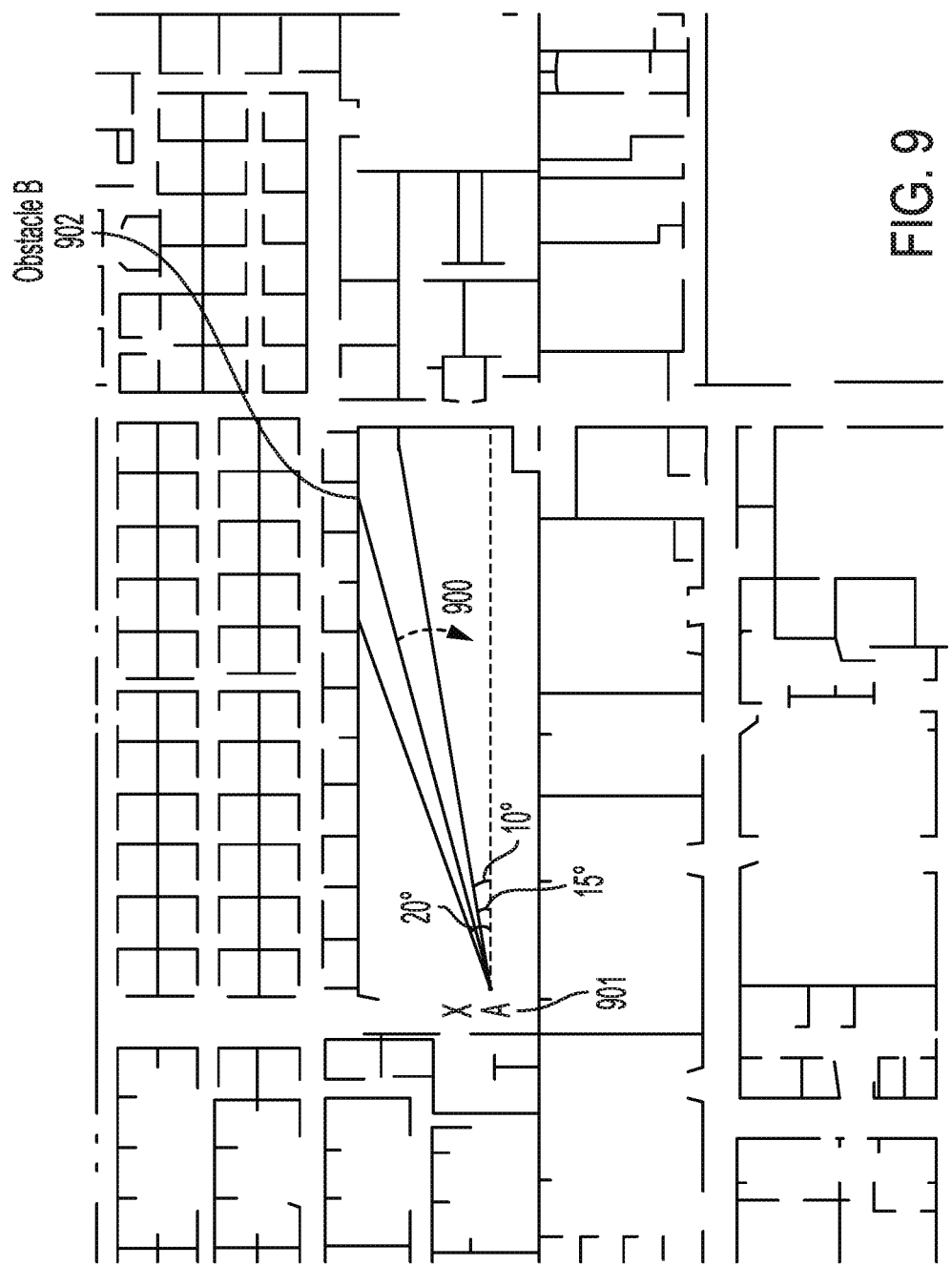
FIG. 9 illustrates example particle distances.

For instance, referring to the example above, the indoor tracking system may determine a distance between each particle's location and a nearest obstacle at one or more of the identified target angles illustrated in Table 1. FIG. 9 illustrates an illustration of example of such distances for Particle A at the various thetas.

Examples of such distances for three example particles are illustrated below in Table 2.

TABLE 2

| Particle | Theta (degrees) | Particle distance (feet) |
|---|---|---|
| A | 10 | 25 |
|  | 15 | 18 |
|  | 20 | 14 |
| B | 10 | 9 |
|  | 15 | 6 |
|  | 20 | 4 |
| C | 10 | 7 |
|  | 15 | 6 |
|  | 20 | 21 |

The indoor tracking system may determine 220 a distance between a particle's location and an obstacle depicted on the map at one or more of the identified target angles by measuring a distance between the particle's location and a first obstacle that is encountered at the particular target angle on the map. For example, FIG. 9 illustrates a position of Particle A 901. Line 900 illustrates a distance between Particle A and Obstacle B 902, which is the nearest obstacle encountered when measuring from a theta equal to 15 degrees.

The indoor tracking system may convert 222 the determined distance into an actual distance. The indoor tracking system may convert 222 the determined distance into an actual distance by applying a scaling factor to the determined distance. The scaling factor may be stored in a data store of the indoor tracking system, or a data store associated with the indoor tracking system.

For example, a quarter of an inch on a map may translate to a distance of one foot in the real environment. As such, if a distance between a particle's location and an obstacle is one inch on the map, the actual distance may be determined to be four feet. Additional and/or alternate scaling factors may be used within the scope of this disclosure.

In various embodiments, the indoor tracking system may determine 224 a difference between the mobile device distance at a theta and a particle distance for one or more of the particles at the theta. For instance, referring to the above example, Table 3 illustrates the mobile device distance, particle distance, and difference between the two for each theta.

TABLE 3

| Particle | Theta (degrees) | Mobile device distance (feet) | Particle distance (feet) | Difference (absolute value) |
|---|---|---|---|---|
| A | 10 | 22 | 25 | 3 |
|   | 15 | 16 | 18 | 2 |
|   | 20 | 11 | 14 | 3 |
| B | 10 | 22 | 9 | 13 |
|   | 15 | 16 | 6 | 10 |
|   | 20 | 11 | 4 | 7 |
| C | 10 | 22 | 7 | 15 |
|   | 15 | 16 | 6 | 10 |
|   | 20 | 11 | 21 | 10 |

The indoor tracking system may convert 226 one or more of the distance values to a probability value. In various embodiments, the indoor tracking system may convert 226 one or more of the distance values to a probability value using any suitable probability distribution such as, for example, a Gaussian function.

The indoor tracking system may resample 228 particles based on their probability values. For instance, the system may select particles having a probability value that is within a certain value range or that exceeds a threshold value. The system may discard the other particles. As such, particles whose distance error is relatively small are more likely to be retained in the resampling.

In various embodiments, the system may determine 230 a deviation associated with the probabilities of the particles in the resampling. A deviation may be a measure of the dispersion of the probabilities relative to one or more certain values. For instance, a deviation may be a standard deviation of the probabilities of the particles in the resampling. Additional and/or alternate deviations may be used within the scope of this disclosure.

If the deviation is not less than a threshold value, the system may repeat steps 208-230 using the resampling. In various embodiments, the system may repeat steps 208-230 until the deviation of the probabilities associated with the particles in the resampling converge. The deviation of the probabilities associated with particles in a resampling may converge when it becomes less than a threshold value.

Figure 10:
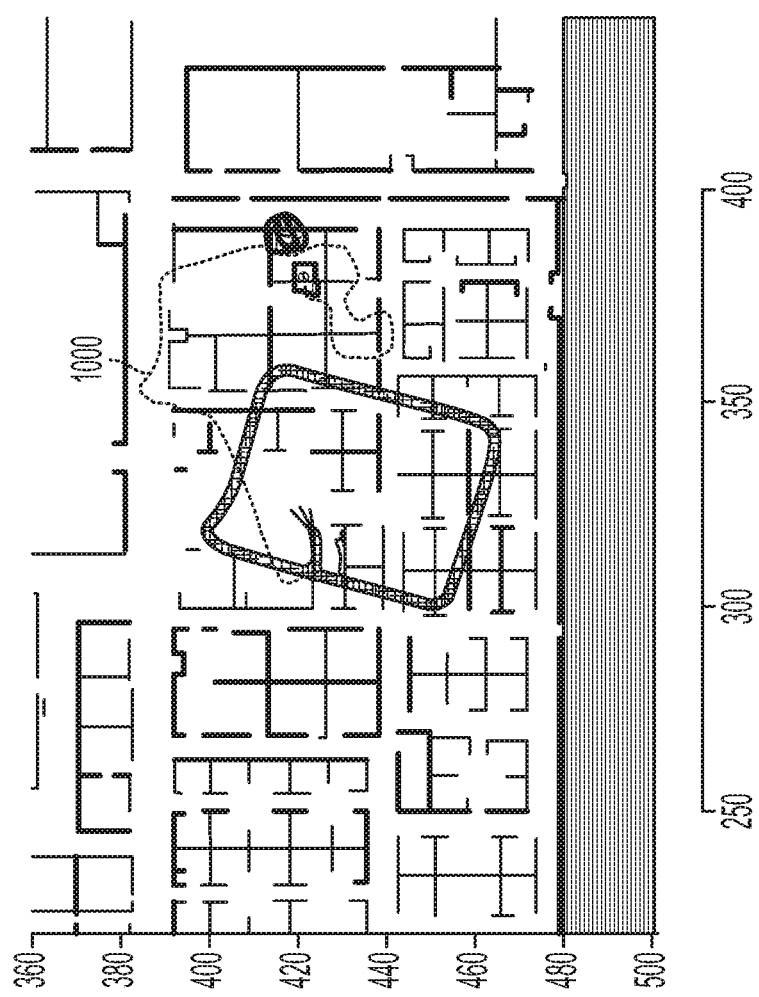
FIG. 10 illustrates an example failed path according to an embodiment.

In response to the deviation of the probabilities converging, the system may optionally adjust 232 the heading of the mobile electronic device. If the error associated with the start heading determination is too high, this may result in a failed path associated with the mobile electronic device. A failed path may be a path or trajectory that is not feasible for an individual or a mobile electronic device to follow. For instance, a failed path may be one that passes through one or more obstacles. FIG. 10 illustrates an example of a failed path 1000 according to an embodiment.

To compensate for potentially high error associated with the start heading, the system may adjust 232 the heading. The system may adjust 232 the heading by traversing data sets associated with a failed path in a forward and/or a backward direction for example, by utilizing a forward-backward propagation strategy.

Figure 11:
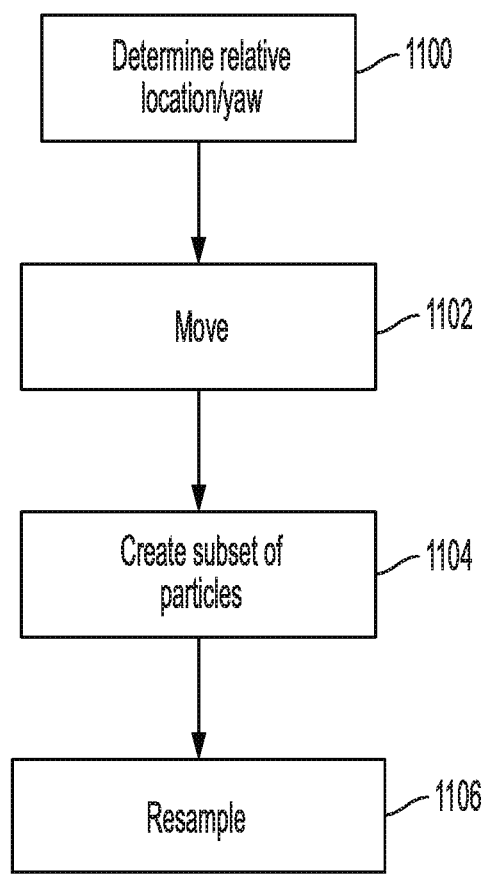
FIG. 11 illustrates an example method of adjusting a heading of a mobile electronic device.

FIG. 11 illustrates an example method of adjusting 232 the heading according to an embodiment. As illustrated in FIG. 11, the system may first traverse the failed path backwards. The system may obtain a current particle set of particles associated with a most recent determined position along the failed path. The system may determine 1100 a relative location and a relative yaw value associated with the mobile electronic device. The system may, for example, determine 1100 a relative location and a relative yaw value in a manner similar to that described above with respect to step 208.

A position of the mobile electronic device may change 1102. For example, a user of the mobile electronic device may move or otherwise change position. In various embodiments, the indoor location tracking system may create 1104 a subset of particles. The system may determine whether the move has caused one or more of the particles in the current particle to hit an obstacle as indicated by the map. If the system determines that the move has caused a particle to hit an obstacle, the system may not include the particle in the subset. As such, the subset of particles that is created 1104 by the system only includes those particles that the move has not caused to hit an obstacle.

The system may then resample 1106 the subset. In various embodiments, the system may randomly sample particles from the subset as part of the resampling. The system may repeat steps 1100-1106 forwards and/or backwards along the failed path in order to adjust the heading of the mobile electronic device.

In various embodiments, the system may estimate 234 an actual location and/or heading of the mobile electronic device based on the resampling. In various embodiments, a system may estimate 234 an actual location and/or heading of the mobile electronic device by determining a metric associated with at least a portion of the particles in the resampling. For example, in an embodiment, the system may estimate 234 an actual location of the mobile electronic device by determining a mean location value or a median location value of the locations of the particles in the resampling. Similarly, the system may estimate 234 an actual heading of a mobile electronic device by determining a mean heading value or a median heading value of the headings of the particles in the resampling.

In various embodiments, the system may adjust an estimated location of the mobile electronic device. The system may adjust an estimated location of the mobile electronic device if the estimated location corresponds to an obstacle on the map. For instance, the system may determine an estimated location, which corresponds to a wall on the map. The system may adjust the estimated location so that the location does not conflict with an obstacle. For instance, the system may determine the nearest location to the estimated location that does not conflict with an obstacle, and may adjust the estimated location to this position.

The system may cause 236 a visual depiction of at least a portion of the map to be displayed on a graphical user interface of the mobile electronic device. The visual depiction may include a visual indication of the estimated actual location on the map. The visual indication may include, for example, a colored dot, a symbol, an image, or other indicator.

As illustrated by FIG. 2, one or more of steps 208-236 may be repeated. For instance, a mobile electronic device user may continue navigating an indoor space, and a visual depiction of his or her location may continue to update on the graphical user interface of the mobile electronic device.

Figure 12:
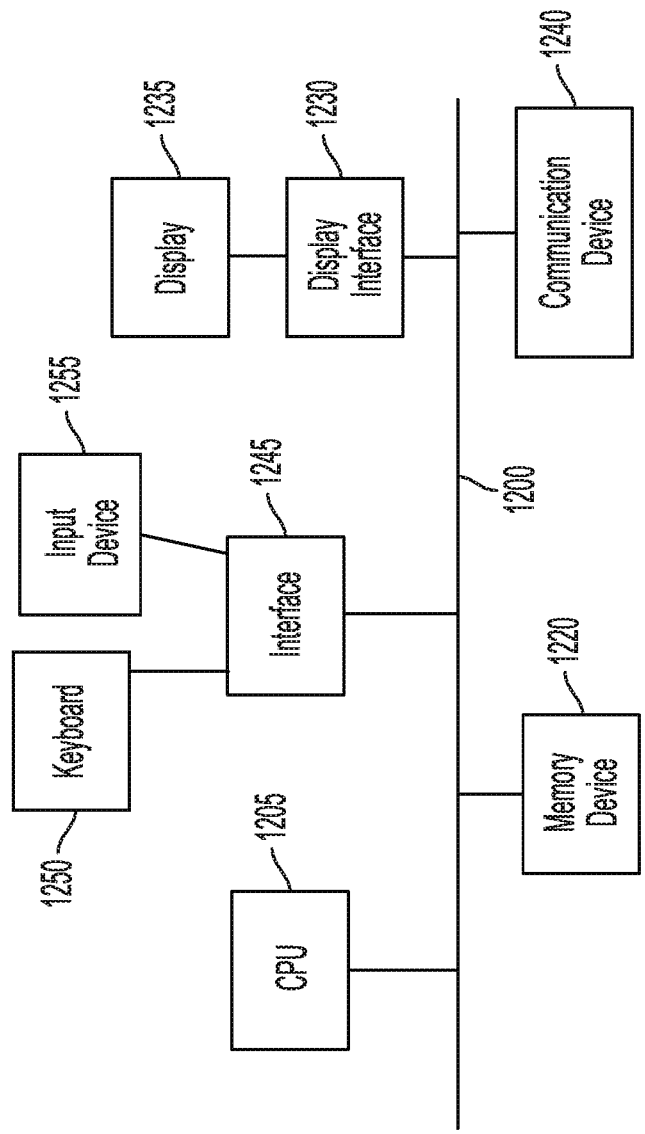
FIG. 12 illustrates a block diagram of example hardware that may be used to contain or implement program instructions according to an embodiment.

FIG. 12 depicts a block diagram of hardware that may be used to contain or implement program instructions, such as those of a cloud-based server, electronic device, virtual machine, or container. A bus 1200 serves as an information highway interconnecting the other illustrated components of the hardware. The bus may be a physical connection between elements of the system, or a wired or wireless communication system via which various elements of the system share data. Processor 1205 is a processing device that performs calculations and logic operations required to execute a program. Processor 1205, alone or in conjunction with one or more of the other elements disclosed in FIG. 12, is an example of a processing device, computing device or processor as such terms are used within this disclosure. The processing device may be a physical processing device, a virtual device contained within another processing device, or a container included within a processing device.

A memory device 1220 is a hardware element or segment of a hardware element on which programming instructions, data, or both may be stored. Read only memory (ROM) and random access memory (RAM) constitute examples of memory devices, along with cloud storage services.

An optional display interface 1230 may permit information to be displayed on the display 1235 in audio, visual, graphic or alphanumeric format. Communication with external devices, such as a printing device, may occur using various communication devices 1240, such as a communication port or antenna. A communication device 1240 may be communicatively connected to a communication network, such as the Internet or an intranet.

The hardware may also include a user input interface 1245 which allows for receipt of data from input devices such as a keyboard or keypad 1250, or other input device 1255 such as a mouse, a touch pad, a touch screen, a remote control, a pointing device, a video input device and/or a microphone. Data also may be received from an image capturing device 1210 such as a digital camera or video camera. A positional sensor 1215 and/or motion sensor 1265 may be included to detect position and movement of the device. Examples of motion sensors 1265 include gyroscopes or accelerometers. An example of a positional sensor 1215 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of determining a distance between a mobile electronic device and an obstacle in an environment, the method comprising:
by an electronic device:
obtaining from a camera of a mobile electronic device one or more images of one or more obstacles in a surrounding environment, and
applying a convolution neural network to one or more of the obtained images to generate a one-dimensional array of depth perception estimates, wherein the array comprises one or more angle-distance pairs, wherein an angle value of each angle-distance pair represents an angle of one or more of the obstacles relative to the camera, wherein a distance value of each angle-distance pairs represents an estimated distance between the camera and one or more of the obstacles at the corresponding angle of the angle-distance pair.

2. The method of claim 1, wherein the convolution neural network is trained on a loss function represented by:

$$L_{Primary} = \frac{1}{n}\sum_{i=1}^{n} e^{|y_i - y_{i(true)}|}$$

where n is the array;
$Y_i$ is an output of the convolution neural network for measurement i,
$Y_{true}$ is an actual distance for measurement i.

3. The method of claim 2, wherein the array has a length of 224.

4. The method of claim 1, wherein each angle value represents an index of the array.

5. The method of claim 1, wherein the camera comprises a monocular RGB (Red, Green, Blue) camera.

6. The method of claim 1, wherein the camera comprises a rear-facing camera.

7. The method of claim 1, wherein the convolution neural network comprises:
one or more trainable convolution layers;
one or more global average pooling layers; and
a fully-connected layer.

8. The method of claim 7, wherein:
the one or more of the trainable convolution layers are arranged in a sequence,
one or more of the trainable convolution layers is configured to accept as input an output of a previous trainable convolution layer in the sequence and filter it with its own kernel.

9. The method of claim 1, further comprising fine tuning the convolution neural network using the following function:

$$L_{Secondary} = \frac{1}{n}\sum_{i=1}^{n} |y_i - y_{i(true)}|$$

where n is a matrix of depth perception estimates having a length of 224;
$Y_i$ is an output of the convolution neural network for measurement i
$Y_{true}$ is an actual distance for measurement i.

10. The method of claim 1, further comprising applying a second convolution neural network to one or more of the obtained images to generate a confidence metric associated with one or more of the depth perception estimates, wherein the confidence metric represents an indication of how accurate the associated depth perception estimate is.

11. The method of claim 10, wherein the second convolution neural network comprises:
one or more trainable convolution layers;
one or more global maximum pooling layers; and
a confidence layer.

12. The method of claim 10, further comprising not updating the convolution neural network to incorporate any of the depth perception estimates that are associated with a confidence metric that is below a threshold value or outside of a threshold range of values.

13. A system of determining a distance between a mobile electronic device and an obstacle in an environment, the system comprising:
   an electronic device; and
   a computer-readable storage medium comprising one or more programming instructions that, when executed, cause the electronic device to:
      obtain from a camera of a mobile electronic device one or more images of one or more obstacles in a surrounding environment, and
      apply a convolution neural network to one or more of the obtained images to generate a one-dimensional array of depth perception estimates, wherein the array comprises one or more angle-distance pairs, wherein an angle value of each angle-distance pair represents an angle of one or more of the obstacles relative to the camera, wherein a distance value of each angle-distance pairs represents an estimated distance between the camera and one or more of the obstacles at the corresponding angle of the angle-distance pair.

14. The system of claim 13, wherein the convolution neural network is trained on a loss function represented by:

$$L_{Primary} = \frac{1}{n}\sum_{i=1}^{n} e^{|y_i - y_{i(true)}|}$$

where n is the array;
   $Y_i$ is an output of the convolution neural network for measurement i,
   $Y_{true}$ is an actual distance for measurement i.

15. The system of claim 14, wherein the array has a length of 224.

16. The system of claim 13, wherein each angle value represents an index of the array.

17. The system of claim 13, wherein the camera comprises a monocular RGB (Red, Green, Blue) camera.

18. The system of claim 13, wherein the camera comprises a rear-facing camera.

19. The system of claim 13, wherein the convolution neural network comprises:
   one or more trainable convolution layers;
   one or more global average pooling layers; and
   a fully-connected layer.

20. The system of claim 19, wherein:
   the one or more of the trainable convolution layers are arranged in a sequence,
   one or more of the trainable convolution layers is configured to accept as input an output of a previous trainable convolution layer in the sequence and filter it with its own kernel.

21. The system of claim 13, wherein the computer-readable storage medium further comprises one or more programming instructions that, when executed, cause the electronic device to fine tune the convolution neural network using the following function:

$$L_{Secondary} = \frac{1}{n}\sum_{i=1}^{n} |y_i - y_{i(true)}|$$

where n is a matrix of depth perception estimates having a length of 224;
   $Y_i$ is an output of the convolution neural network for measurement i
   $Y_{true}$ is an actual distance for measurement i.

22. The system of claim 13, wherein the computer-readable storage medium further comprises one or more programming instructions that, when executed, cause the electronic device to apply a second convolution neural network to one or more of the obtained images to generate a confidence metric associated with one or more of the depth perception estimates, wherein confidence metric represents an indication of how accurate the associated depth perception estimate is.

23. The system of claim 22, wherein the second convolution neural network comprises:
   one or more trainable convolution layers;
   one or more global maximum pooling layers; and
   a confidence layer.

24. The system of claim 22, wherein the computer-readable storage medium further comprises one or more programming instructions that, when executed, cause the electronic device to not update the convolution neural network to incorporate any of the depth perception estimates that are associated with a confidence metric that is below a threshold value or outside of a threshold range of values.

* * * * *